United States Patent
Peteranecz

(10) Patent No.: US 10,578,246 B2
(45) Date of Patent: Mar. 3, 2020

(54) HANDLE AND GRIP SYSTEM FOR PAINTING OF HOBBY MINIATURES

(71) Applicant: Christopher A. Peteranecz, Hagerstown, MD (US)

(72) Inventor: Christopher A. Peteranecz, Hagerstown, MD (US)

( * ) Notice: Subject to any disclaimer, the term of this patent is extended or adjusted under 35 U.S.C. 154(b) by 0 days.

(21) Appl. No.: 16/121,802

(22) Filed: Sep. 5, 2018

(65) Prior Publication Data

US 2019/0154197 A1 May 23, 2019

Related U.S. Application Data

(60) Provisional application No. 62/589,351, filed on Nov. 21, 2017.

(51) Int. Cl.
F16M 13/04 (2006.01)
A63H 33/42 (2006.01)

(52) U.S. Cl.
CPC ............. *F16M 13/04* (2013.01); *A63H 33/42* (2013.01)

(58) Field of Classification Search
CPC combination set(s) only.
See application file for complete search history.

(56) References Cited

U.S. PATENT DOCUMENTS

| | | | |
|---|---|---|---|
| 1,556,010 A | 10/1925 | Fishelov et al. | |
| 1,742,212 A | 1/1930 | Muldoon et al. | |
| 3,303,953 A * | 2/1967 | Frank | B65D 41/02 215/228 |
| 3,400,926 A | 9/1968 | Stoltz et al. | |
| 3,866,803 A * | 2/1975 | Kipfmueller | B65D 1/32 222/179.5 |
| 4,467,554 A | 8/1984 | Russell | |
| 4,595,094 A | 6/1986 | Reid | |
| 4,667,359 A * | 5/1987 | Polotti | A47G 23/0241 215/390 |
| 4,950,509 A | 8/1990 | DeMott | |
| 4,957,253 A * | 9/1990 | Roy | A61J 9/0676 248/104 |
| 5,240,259 A | 8/1993 | OGrady | |
| 5,487,482 A * | 1/1996 | Rocheleau | B65D 23/106 215/396 |
| 5,540,611 A * | 7/1996 | Lapoint | A63H 3/005 215/229 |
| 5,636,740 A * | 6/1997 | Finkiewicz | B65D 47/0842 206/457 |
| 6,019,335 A * | 2/2000 | Sehati | A45F 5/02 224/148.4 |
| 6,068,543 A | 5/2000 | Renn | |
| 6,131,779 A * | 10/2000 | Gendala | A45F 5/02 224/148.1 |
| 6,228,443 B1 | 5/2001 | Ditto et al. | |

(Continued)

*Primary Examiner* — Monica E Millner

(57) ABSTRACT

A handle and grip system for manipulating miniature objects is provided. The system embodies a handle portion and a base portion. The handle portion is adapted to provide three finger rests and a grip portion dimensioned to snap on to a neck portion of the base portion for simultaneously rotating and manipulating both portions. The base portion provides supporting surfaces for the miniature object. A base extension may also be provided by the system to removably engage the base holder to provide full support or for providing additional support while the user manipulates the snapped-on handle portion.

11 Claims, 8 Drawing Sheets

(56) References Cited

U.S. PATENT DOCUMENTS

| | | | | |
|---|---|---|---|---|
| 6,352,235 B2* | 3/2002 | Cizek | ............... | B65D 23/106 |
| | | | | 215/398 |
| 6,352,321 B1 | 3/2002 | Munoz | | |
| 6,497,323 B2 | 12/2002 | Lewis | | |
| 6,695,371 B1* | 2/2004 | Simkins | ............... | A45F 3/18 |
| | | | | 224/148.4 |
| 6,837,472 B1* | 1/2005 | Beutz | ............... | A45F 3/16 |
| | | | | 224/148.4 |
| 6,880,714 B2* | 4/2005 | Blanchester | ......... | B65D 23/003 |
| | | | | 215/395 |
| 6,913,159 B1* | 7/2005 | Goldberg | ............ | B65D 23/106 |
| | | | | 215/395 |
| 7,029,360 B1* | 4/2006 | Hawkins | ............... | A63H 33/28 |
| | | | | 206/457 |
| 7,143,904 B2* | 12/2006 | Zhang | ............... | B65D 23/104 |
| | | | | 215/396 |
| 7,614,532 B1* | 11/2009 | Dague | ............... | A45F 5/02 |
| | | | | 224/148.7 |
| 7,624,701 B2* | 12/2009 | Ver Hage | ............... | A01K 7/06 |
| | | | | 119/72 |
| D786,129 S | 5/2017 | Chan et al. | | |
| 9,687,752 B2 | 6/2017 | Clark et al. | | |
| 10,220,987 B2* | 3/2019 | Robinson | ............... | B65D 47/06 |
| 2002/0084240 A1* | 7/2002 | Yu-Hsien | ............ | B65D 23/104 |
| | | | | 215/258 |
| 2005/0150902 A1* | 7/2005 | Cho | ............... | B65D 51/2892 |
| | | | | 206/219 |
| 2006/0180567 A1* | 8/2006 | Ott | ............... | A45F 3/16 |
| | | | | 215/293 |
| 2006/0205318 A1 | 9/2006 | Edwards et al. | | |
| 2013/0005213 A1 | 1/2013 | Baker | | |

* cited by examiner

HANDLE AND GRIP SYSTEM FOR PAINTING OF HOBBY MINIATURES

CROSS-REFERENCE TO RELATED APPLICATION

This application claims the benefit of priority of U.S. provisional application No. 62/589,351, filed 21 Nov. 2017, the contents of which are herein incorporated by reference.

BACKGROUND OF THE INVENTION

The present invention relates to hobby miniature tools and, more particularly, to a handle and grip system for painting hobby miniatures.

When painting hobby miniatures or other small hobby materials it is hard to hold onto the miniature object. Generally speaking, after an extended period of time a painter's hands can start to hurt. Specifically, while painting, hobbyists normally have to apply the painting substance to the miniature at several different angles and then sometimes rub off some of the painting substance. Since miniature hobby items are so small and delicate, and so providing few ways to hold them, the above-mentioned pain tends to be exacerbated through this process.

Current grip methods and solutions are not adapted to enable access to every angle of miniatures and also do not have good control and maneuverability. With other gripping methods it is also difficult to switch what you are working on so a user would have to get multiples grips or risk breaking or smudging their work. In other words, prior to the present invention there were no good options for increasing stability and accuracy while painting miniatures and it was hard to switch from one to the next. As a result, miniature painters were not afforded a full range of support (compared to the present invention), while painting miniatures. Furthermore, the current solutions require the painter to deal with the following disadvantages: the increased the weight of the current methods; the lack of multiple hold positions; and the requirement that the user release their hand to rotate a piece around—causing painter's hands to get tired faster.

As can be seen, there is a need for a handle and grip system for painting miniature objects, wherein the system provides multiple base and grip options and hold positions, as well as a handle which doubles as an additional stability bar (for example, a user may rest their paint brush against the handle during use). The greater array of hold positions increases accuracy and lessen hold fatigue. Being made from injection molded ABS plastic the present invention is also lighter and more durable than current systems. Furthermore, an inventive click connection enables users to rotate their piece 360 degrees without releasing their grip.

The handle and grip system also provides a unique base design allowing users to have much better grip on their miniature while not touching the (possibly wet) miniature. The handle portion is dimensioned and adapted to be held in many different positions, for example a user could grip it as they would a tea-cup handle or rotate it 180 degrees and hold it in a "pistol grip" (see FIG. 5), whichever reduce strain and fatigue. As mentioned above, the handle portion can also be used as a brush support to lessen fatigue.

Also, the present invention the use incorporates the use of bottle caps and corks to mount the miniature thereon, and so a user can easily switch out their pieces without risk of smudging or breaking the piece as they do not have to touch the wet miniature.

In short, the miniature painting handle and grip system allows users to achieve better results with higher precision and improved stability while painting miniature objects.

SUMMARY OF THE INVENTION

In one aspect of the present invention, a handle and grip system includes a handle portion providing a central portion extending between a distal end and a proximal end; a tear-dropped shaped pinch tab extending from the distal end; and a gripping portion extending from a leading portion of the pinch tab; and a base portion providing a foundation; a base holder; and a neck portion interconnecting the foundation and the base holder; the neck portion having a periphery less than a periphery of the foundation; and the neck portion is adapted to removably engage the gripping portion is a fixed connection.

In another aspect of the present invention, the handle and grip system includes a handle portion providing a central portion extending between a distal end and a proximal end; a flange extending along each of the two opposing longitudinal edges of the central portion, perpendicularly oriented thereto so as to define a channel dimensioned as a central finger rest; a tear-dropped shaped pinch tab extending from the distal end; a gripping portion extending from a leading portion of the pinch tab, wherein the gripping portion comprising two prongs defining a gripping void, and wherein the gripping portion is movable between a retracted and an extended condition; each prong terminating in a thumb tab curving away from the gripping void; and a proximal finger rest extending generally perpendicularly from the proximal end; a base portion providing a foundation; a stand removably attachable to the foundation; the stand providing a supporting surface for a miniature; the foundation providing a cavity dimensioned and adapted to receive a plug; a base holder; an accessory attachment hole in a floor of said cavity, the accessory attachment hole extending through to the base holder; and a neck portion interconnecting the foundation and the base holder; the neck portion having a periphery less than a periphery of the foundation; and the neck portion to adapted to removably engage the gripping void in a fixed connection; and a base extension adapted to be gripped by a single hand of a human user; and the base extension providing a removable connection with the base holder.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a handle and grip system for manipulating miniature objects. The system embodies a handle portion and a base portion. The handle portion is adapted to provide three finger rests and a grip portion dimensioned to snap on to a neck portion of the base portion. The base portion provides supporting surfaces for the miniature object. A base extension may also be provided by the system to removably engage the base holder to provide full support or for providing additional support while the user manipulates the snapped-on handle portion.

Figure 1:
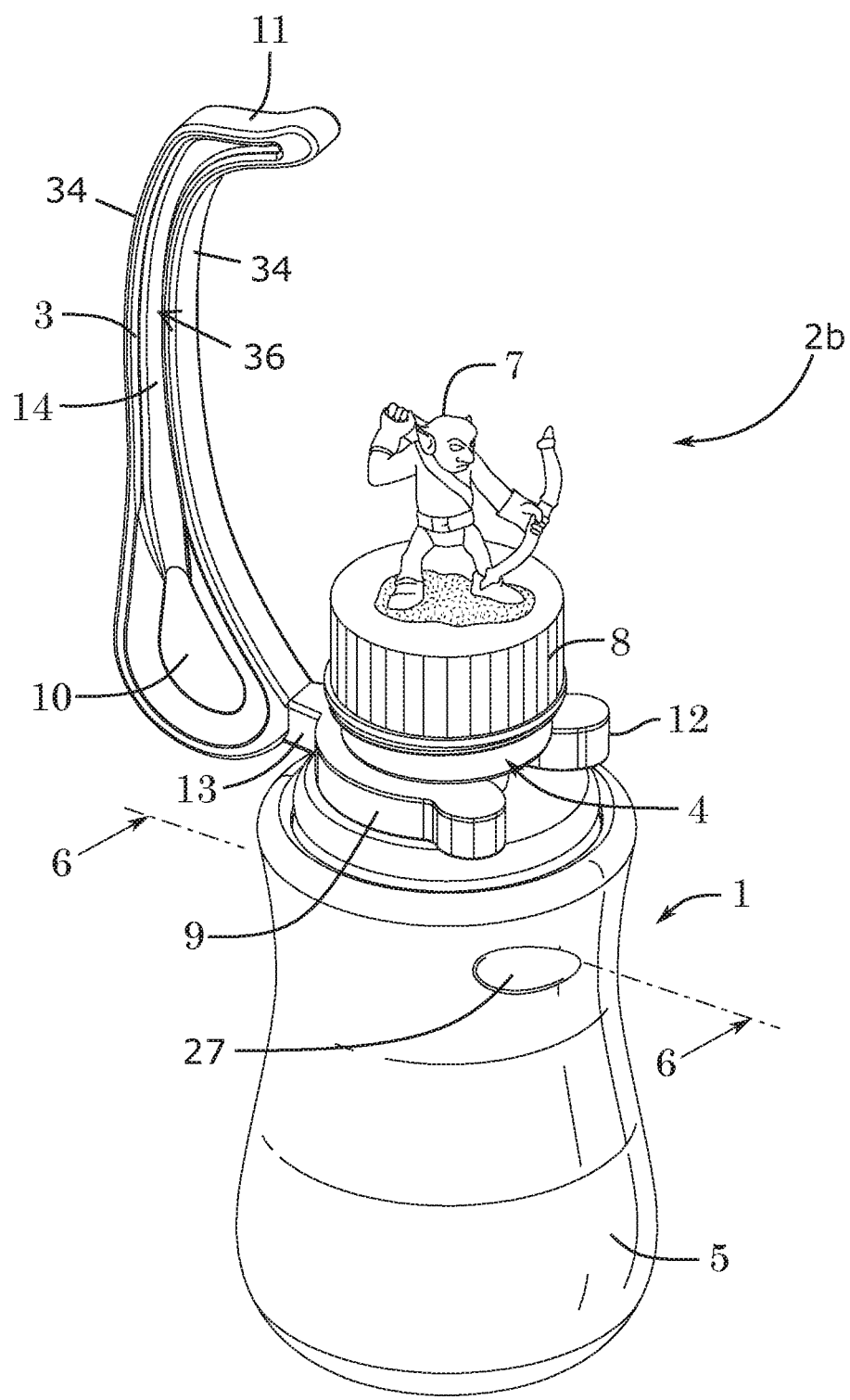
FIG. 1 is a perspective view of an exemplary embodiment of the present invention, shown in use.
Figure 3:
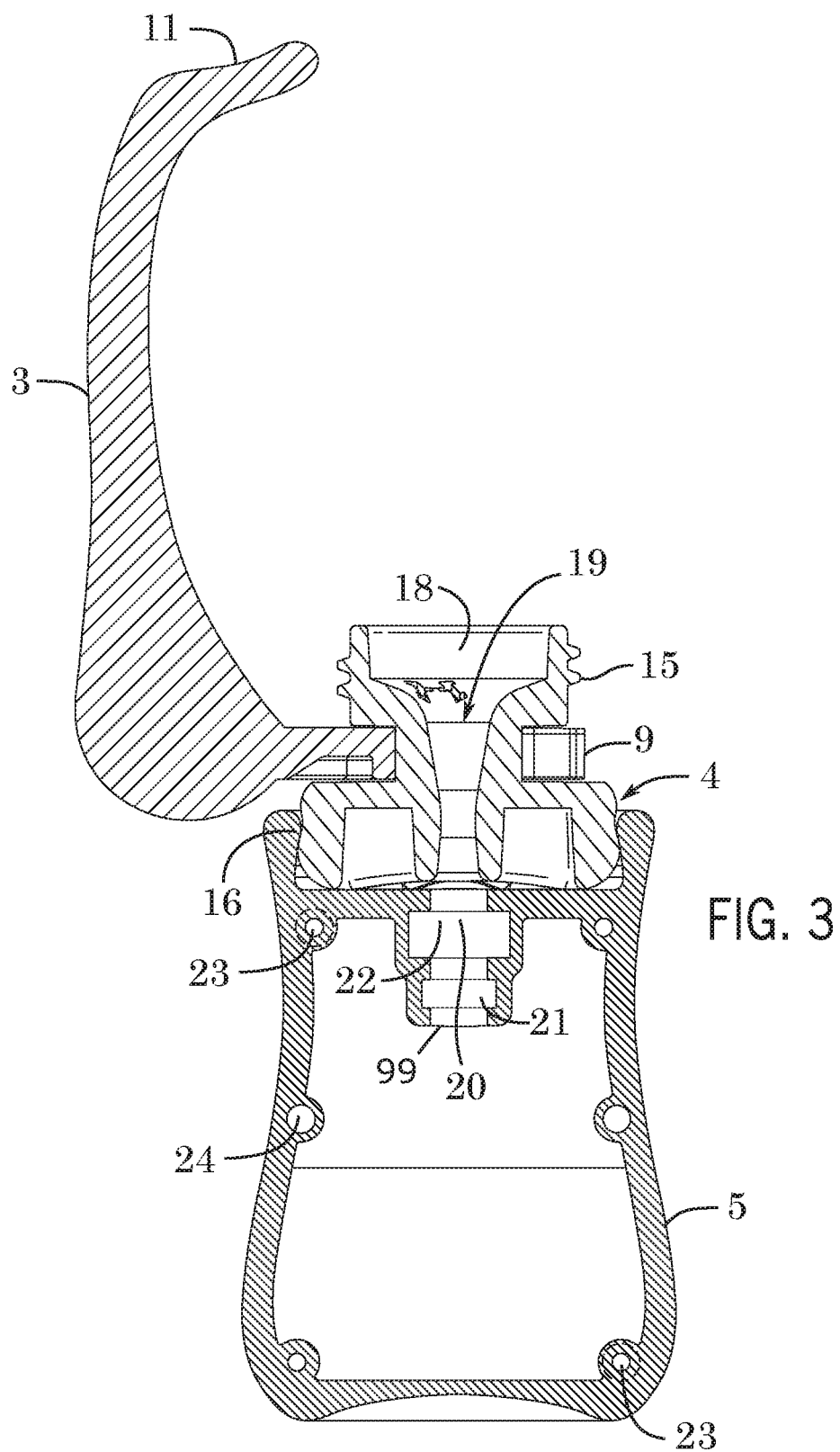
FIG. 3 is a cross-sectional view of an exemplary embodiment of the present invention.
Figure 4:
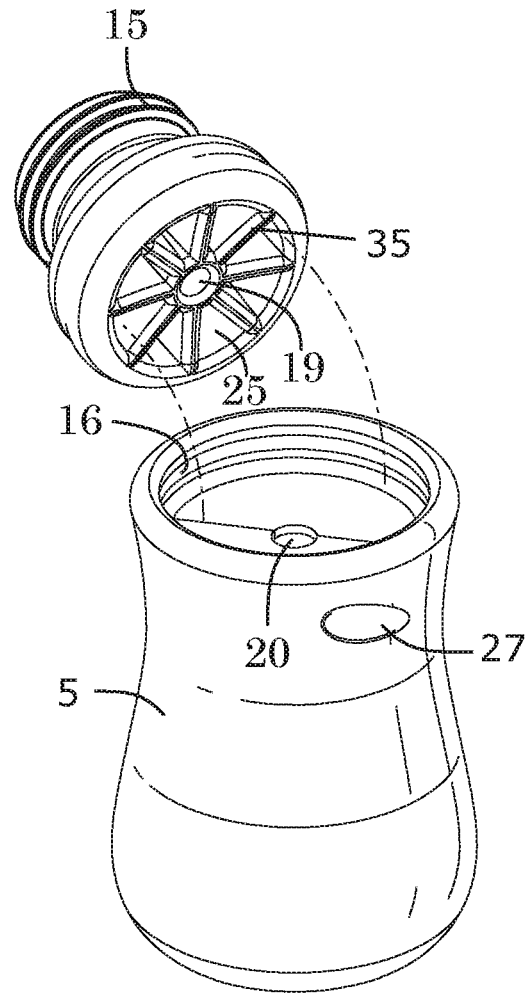
FIG. 4 is a detail clamshell exploded perspective view of an exemplary embodiment of the present invention.
Figure 5:
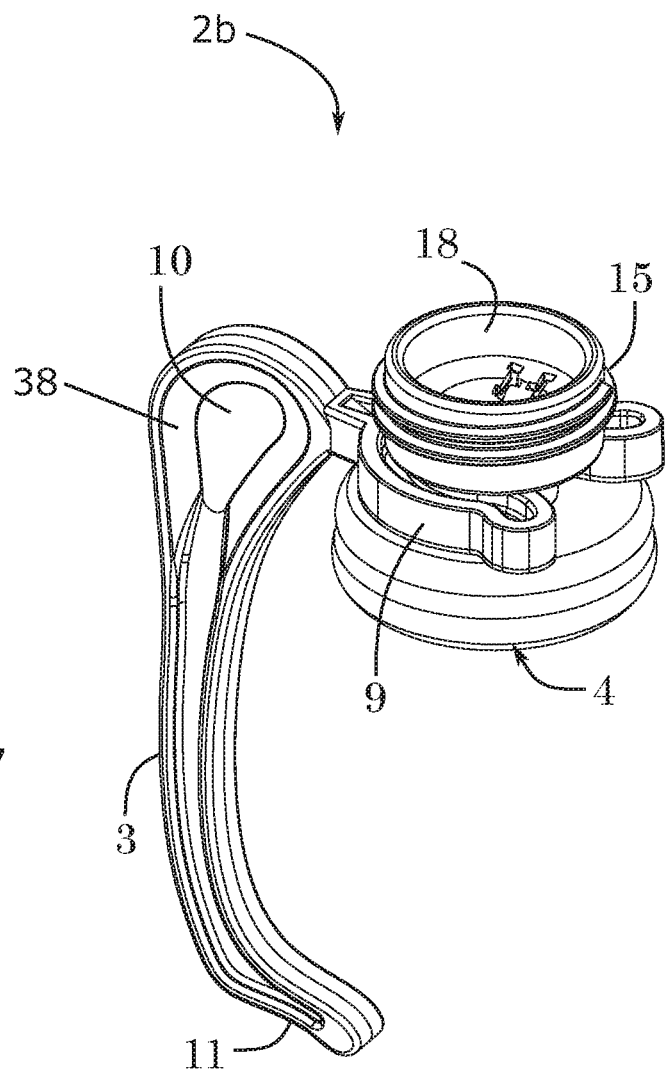
FIG. 5 is a detail perspective view of an exemplary embodiment of the present invention, showing an alternative orientation of the handle 3, wherein the handle 3 is movable between innumerable orientations and angles.
Figure 6:
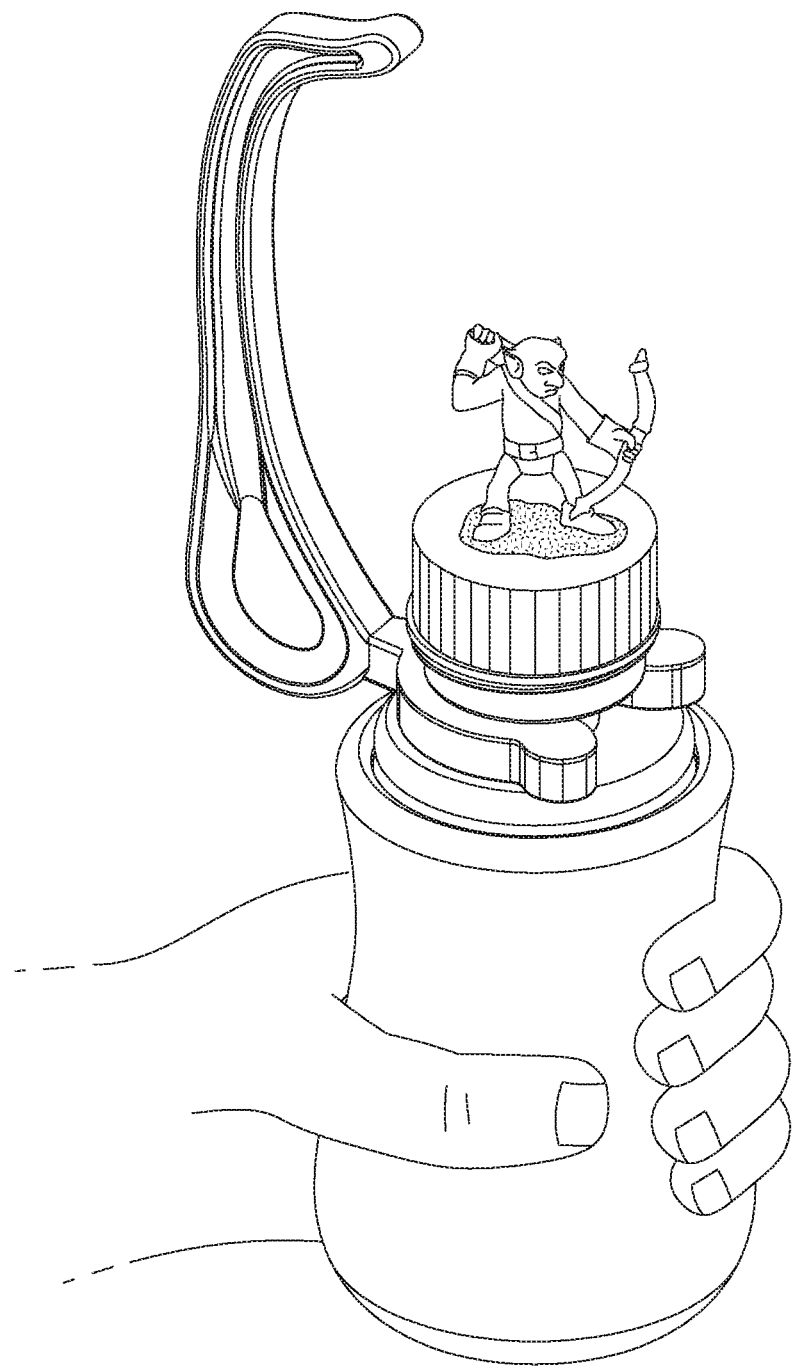
FIG. 6 through FIG. 9 are perspective views of an exemplary embodiment of the present invention, shown in use.
Figure 7:
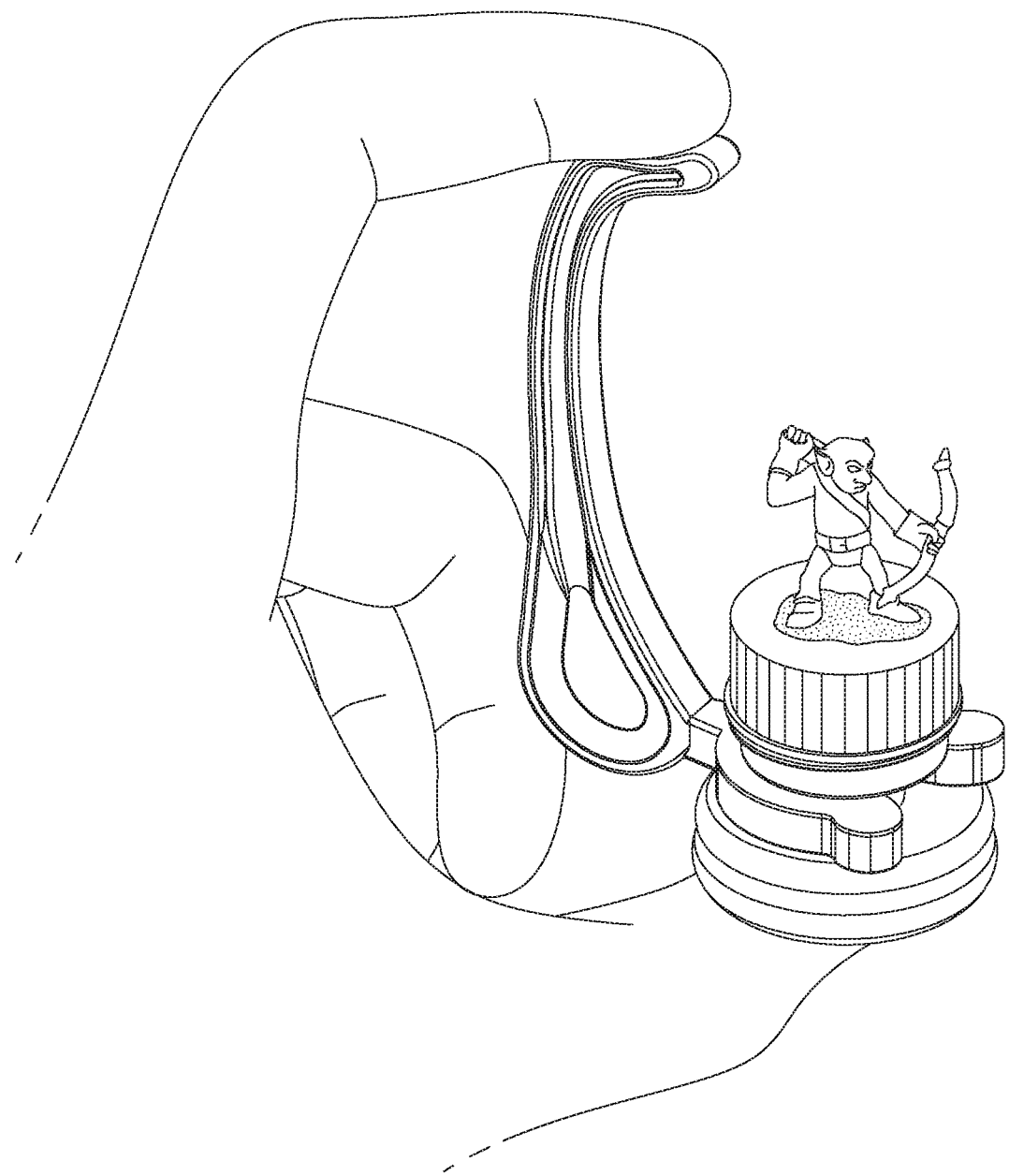
Figure 8:
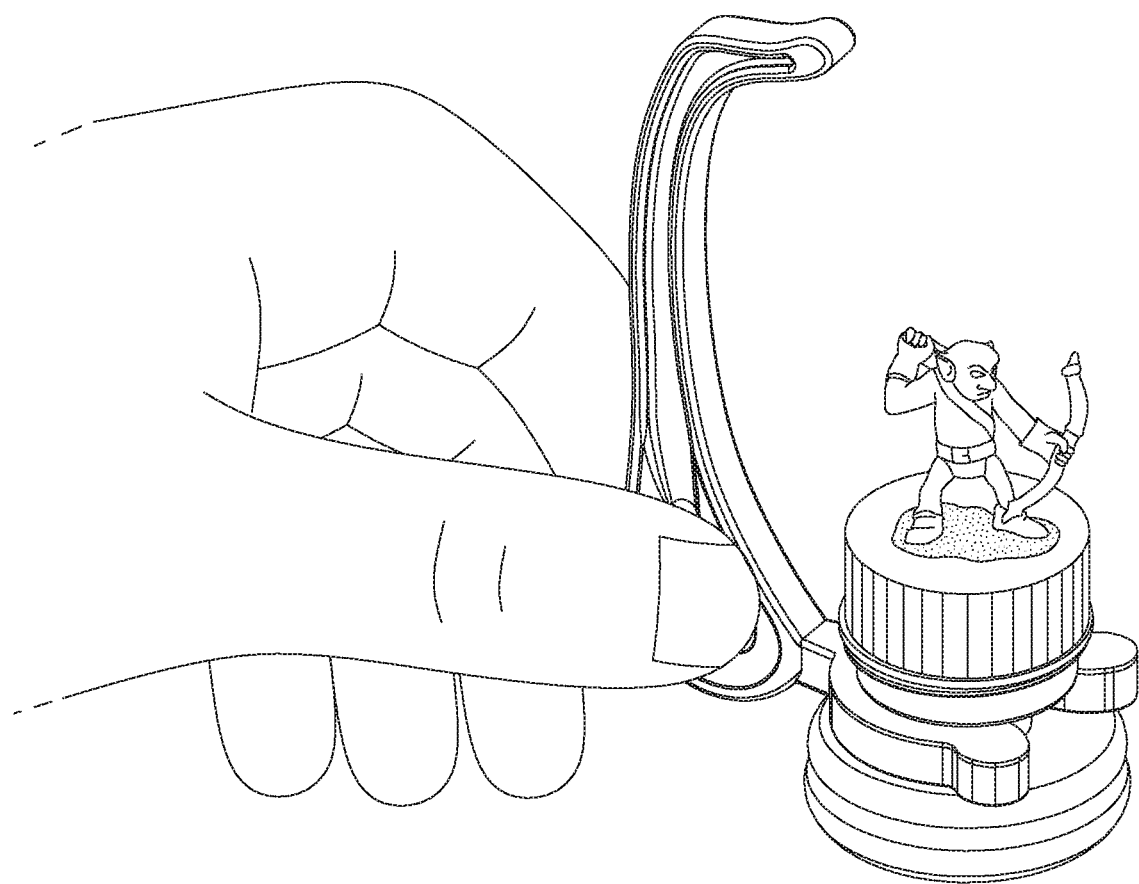
Figure 9:
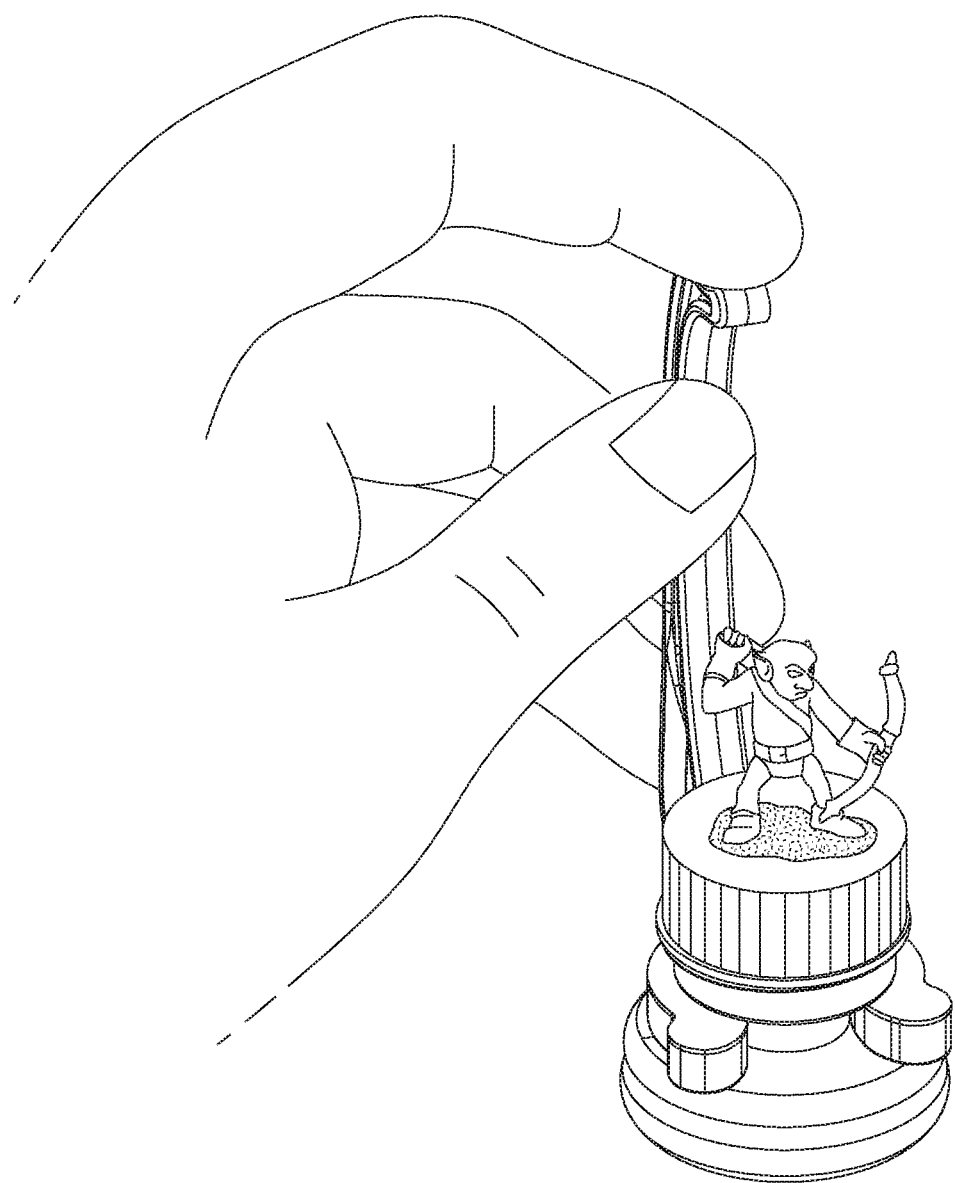

Referring to FIGS. 1 through 9, the present invention may include a handle and grip system 1 for painting of miniature objects. The handle and grip system may include a handle portion 3 extending to a grip portion 9, that in turn engages a base holder 4, embodying a handle and base configuration 2a, as illustrated in FIG. 5. A base extension 5 may be attached to the base holder to enable a handle and base extension configuration 2b, as illustrated in FIG. 1.

The handle portion 3 provides a central portion 14 extending from a proximal end 30 to a distal end 32. As the central portion 14 extends from the proximal end 30 to the distal end 32 it may have a curvature.

Extending along opposing longitudinal edges of the central portion 14 are flanges 34 perpendicularly oriented relative to the flanges 34; generally defining an 'I-beam' cross section. In certain embodiments, the body portion 14 may be a planar element or may be a void between the opposing longitudinal flanges 34. In either embodiment, a traction channel 36 is formed which can be utilized as a proximal finger rest.

At the distal end 32 the opposing longitudinal flanges 34 may start to diverge so as to define a tear-dropped shaped pinch tab 10, which may be dimensioned and adapted to be used as a distal finger rest. The pinch tab 10 may a tear-dropped shaped void or planar element, the planar element may be thinner than the thickness of the planar element of the central portion 14. Extending between the opposing longitudinal flanges 34 and the pinch tab 10 may be webbing 38. The webbing 38 may taper toward the pinch tab 10.

At the proximal end 30 the central portion 14 may turn toward in a first direction providing a central finger rest 11, which may also include the opposing flanges 34. The first direction is transverse or perpendicular to the general longitudinal direction of the central portion 14 between the distal and proximate 32 and 30 ends.

From a leading portion of the pinch tab 10 extends a variable length arm 13 in the first direction. The variable length arm 13 may be telescopic or similarly structured to be selectively movable between a plurality of adjustable lengths. The arm 13 connects to the grip portion 9 providing two spaced apart prongs 40, forming a horseshoe shape that defines a gripping void 42. At the distal ends of each prong 40 are arcuate thumb tabs 12 that curve away from the gripping void 42. The thumb tabs 12 are dimensioned and adapted to engage a user's thumb for removing the handle 3 from base holder 4.

The handle and grip system 1 may include a base portion 50. The base portion 50 may include the base extension 5 that is removable attachable to the base holder 4. To facilitate such an attachment, a click connection (connecting 4 to 5) where 54 clicks into 16 and is held in place by tension may be provided. The screw attachment capabilities of connecting 4 to 5 are via the nut and screw going through 19/20. In an alternative embodiment, the removable attachment is facilitated through the base extension 5 provides a cavity 52 dimensioned and adapted to mate with the base holder 4. The cavity 52 may provide interior threading 16, while the base holder 4 may provide exterior threading 54 to mate thereto. In certain embodiments, the base holder 4 may provide an accessory attachment hole/plug ejector 19 (that communicates through the longitudinal length of the base holder 4) that aligns with an accessory attachment screw hole 20 provided in the floor of the cavity 52. See below for the plug ejector capability. The accessory attachment capability may include nested portion 90 internal to the base extension 5 (that may be two separable elements if the base extension were formed from two shells—see below for more). The nested portions 90 may provide slots for a first nut 21 and a slot for second (large diameter) nut 22 may engaged a bolt-like element 99 that may slide through the screw hole 20 and in part through accessory attachment hole 19. Thereby, enabling a more secure connect of the base extension 5 to the base holder 4 or between the base extension 5 and an accessory or other object (without the base holder present).

The base portion 50 extends from the base holder 4 by way of a neck portion 17 which interconnects the base holder 4 and a foundation 58 having a greater diameter/periphery than that of the neck portion 17. The foundation 58 provides a cavity 18 dimensioned and adapted to provide a plug. The plug may be made of cork or similar material that is lightweight while providing compressive strength. In certain embodiments, the plug may be a 20 mm diameter cork. The accessory attachment hole/plug ejector 19 is below the plug, for ejecting the plug (by extending an elongated member through the accessory attachment hole/plug ejector 19) as the plug tends to form a snug fit within the cavity 18. In certain embodiments, not shown in the figures, the miniature 7 may be mounted on the plug during operation.

Figure 2:
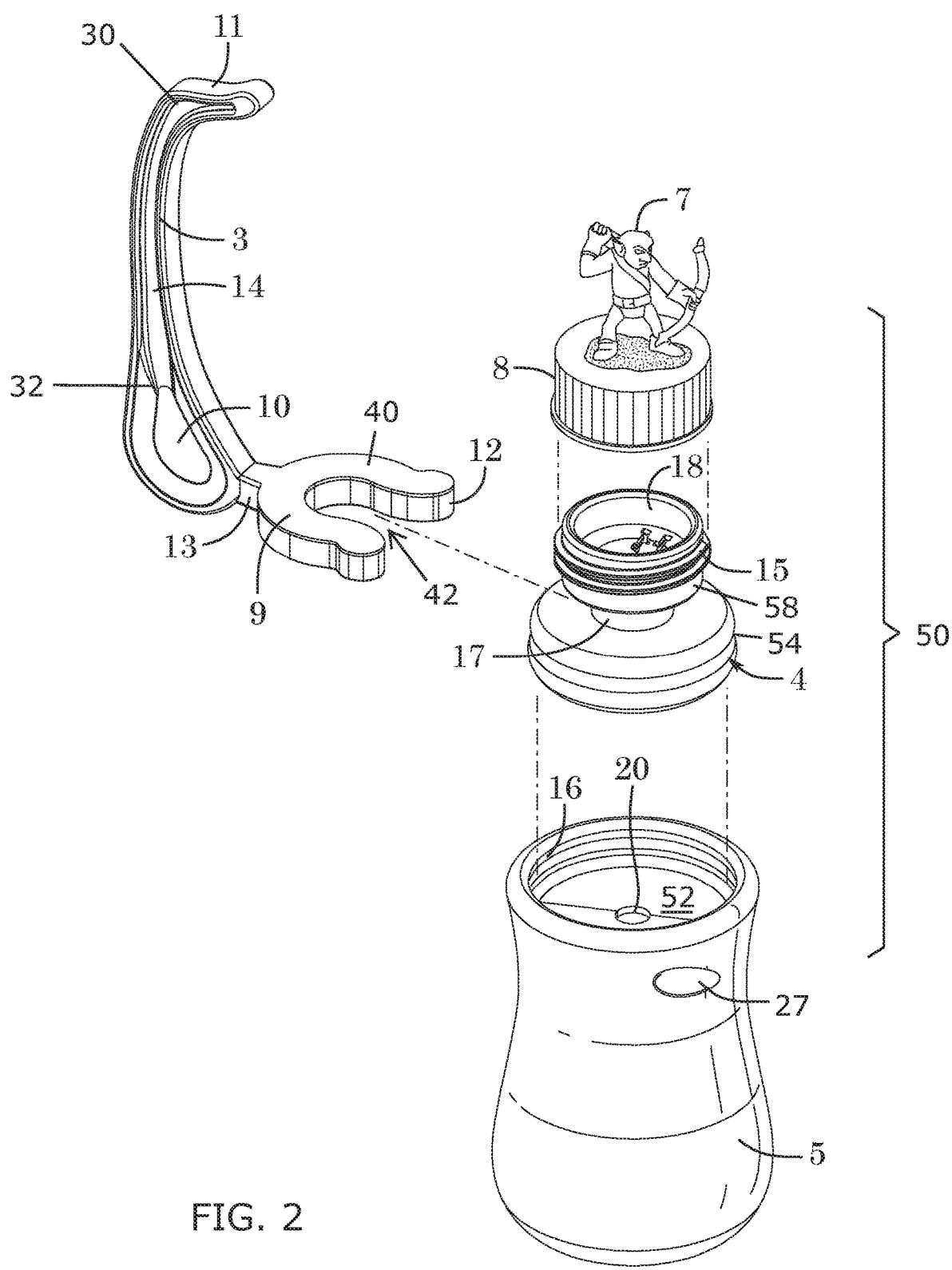
FIG. 2 is an exploded perspective view of an exemplary embodiment of the present invention.

The foundation 58 provides exterior foundational threading 15 dimensioned and adapted to engage cooperating threading along an interior of a stand 8. In certain embodiments, the stand may be a (in some embodiments, 28 mm) bottle cap, thereby providing a very plentiful, essentially free (otherwise discarded) resource for each of many miniatures 7 to be supported on the upper surface of the stand 8, as illustrated in FIGS. 1 and 2.

The gripping void 42 of the grip portion 9 and the neck portion 17 are dimensioned and adapted so that the grip portion snaps-on or clicks-on to the neck portion 17 forming a secure, fixed connection, preventing rotation of the base holder 4 relative to the handle; rather, the rotate in unison.

The base extension 5 may be generally cylindrical or other shapes so long as it functions in accordance as disclosed herein. In certain embodiments, the base extension 5 may be two shells separable along line of separation 6 illustrated in FIG. 1. The two shells may be removably connected by holes 23 and aligned pegs 24, as illustrated in FIG. 3, or other methods of removably joining two objects to each other. Screw hole 27 may be used to facilitate the connection between holes 23 and pegs 24, from the outside of the base extension. The base extension 5 can function as a painting holder by itself (full support as, for example, a presentation stand when not painting) or function as additional support for the remaining base portion 50 when the handle and grip system 1 is engaged to the neck portion 17.

The handle and grip system 1 can be injection molded or 3D printed from 3D renderings from various plasticized material to enable a sturdy but lightweight design.

Referring to FIGS. 6 through 9, a method of using the present invention may include the following. The handle and grip system 1 disclosed above may be provided. A user may manipulate the handle portion 3 to pinch the grip portion 9 for securely engaging the neck portion 17 of the base holder 4. The handle 3 can also be disengaged and then flipped 180 degrees and securely re-engaged (re-clicked to) with the neck portion 17. The user may connect the base holder 4 to the base extension 5 to further control and manipulate the miniature 7 attached to the stand 8 or the plug during the painting process, thereby enabling comfort while painting, sculpting, carving, or simply attaching the miniature 7. The handle portion 3 is dimensioned and adapted to provide a plurality of finger rests during the handling process.

If the user desires a holding position, the user can spin the base holder 4 (in certain embodiments, by spinning the base extension 5) to get different angles while maintaining their current grip. Moreover, the user may manipulate the handle 3 at any angle for more ways to access the attached miniature 7. They can pinch the pinch tab 10, for example, between their forefinger and thumb to provide a secure, stable hold on the base holder 4 via the gripping portion 9. The user could also utilize one or more of the finger rests 11 and 14 during the painting process. The user could rest their thumb in one of many fourth finger rests 25 on the bottom side of the base holder 4, as illustrated in FIG. 4. The fourth finger rests 25 may be spaces between spoke like elements 35 radially extending from the accessory attachment hole 19.

Additionally, the present invention may enable jewelers, model train enthusiasts, doll house makers or other hobbyists utilizing smaller elements to benefit from the extra control enabled by the handle and grip system 1.

It should be understood, of course, that the foregoing relates to exemplary embodiments of the invention and that modifications may be made without departing from the spirit and scope of the invention as set forth in the following claims.

What is claimed is:

1. A handle and grip system comprising:
    a handle portion comprising:
        a central portion extending between a distal end and a proximal end;
        a flange extending along each of two opposing longitudinal edges of the central portion, perpendicularly oriented thereto so as to define a channel dimensioned as a central finger rest;
        a tear-dropped shaped pinch tab extending from the distal end;
        the pinch tab circumscribed by said flanges; and
        a gripping portion extending from a leading portion of the pinch tab; and
    a base portion comprising:
        a foundation;
        a base holder; and
        a neck portion for removably engaging the gripping portion.

2. The handle and grip system of claim 1, further comprising:
    a base extension adapted to be gripped by a single hand of a human user; and
    the base extension providing a removable connection with the base holder.

3. The handle and grip system of claim 1, further comprising:
    a stand removably attachable to the foundation; and
    the stand providing a supporting surface for a miniature.

4. The handle and grip system of claim 3, wherein the stand is a bottle cap.

5. The handle and grip system of claim 3, wherein the foundation provides a cavity dimensioned and adapted to receive a plug; and
    an accessory attachment hole in a floor of said cavity, the accessory attachment hole extending through to the base holder.

6. The handle and grip system of claim 1, further comprising a proximal finger rest extending generally perpendicularly from the proximal end.

7. The handle and grip system of claim 1, wherein the gripping portion is movable between a retracted and an extended condition.

8. The handle and grip system of claim 1, wherein the gripping portion comprising two prongs defining a gripping void; and the gripping void dimensioned to snap on to the neck portion.

9. The handle and grip system of claim 8, wherein each prong terminating in a thumb tab curving away from the gripping void.

10. A handle and grip system comprising:
    a handle portion comprising:
        a central portion extending between a distal end and a proximal end;
        a flange extending along each of the two opposing longitudinal edges of the central portion, perpendicularly oriented thereto so as to define a channel dimensioned as a central finger rest;
        a tear-dropped shaped pinch tab extending from the distal end, the pinch tab circumscribed by said flanges;
        a gripping portion extending from a leading portion of the pinch tab, wherein the gripping portion comprising two prongs defining a gripping void, and wherein the gripping portion is movable between a retracted and an extended condition;
        each prong terminating in a thumb tab curving away from the gripping void; and
        a proximal finger rest extending generally perpendicularly from the proximal end;
    a base portion comprising:
        a foundation;
        a stand removably attachable to the foundation;
        the stand providing a supporting surface for a miniature;
        the foundation providing a cavity dimensioned and adapted to receive a plug;
        a base holder;
        an accessory attachment hole in a floor of said cavity, the accessory attachment hole extending through to the base holder; and
        a neck portion interconnecting the foundation and the base holder; the neck portion having a periphery less than a periphery of the foundation; and the neck portion to adapted to removably engage the gripping void in a fixed connection; and a base extension adapted to be gripped by a single hand of a human user; and the base extension providing a removable connection with the base holder.

11. The handle and grip system of claim 10, wherein the stand is a bottle cap.

\* \* \* \* \*